United States Patent [19]

Mir et al.

[11] Patent Number: 4,614,408
[45] Date of Patent: Sep. 30, 1986

[54] ELECTROOPTIC DEVICE FOR SCANNING AND INFORMATION MODULATING A PLURALITY OF LIGHT BEAMS

[75] Inventors: José M. Mir; John A. Agostinelli, both of Rochester, N.Y.

[73] Assignee: Eastman Kodak Company, Rochester, N.Y.

[21] Appl. No.: 644,301

[22] Filed: Aug. 27, 1984

[51] Int. Cl.$^4$ .................................................. G02F 1/03
[52] U.S. Cl. .................................. 350/388; 350/96.14; 350/379; 350/389; 350/392
[58] Field of Search ............... 350/96.13, 96.14, 96.18, 350/347 E, 347 V, 356, 379, 380–381, 392, 383, 388–389; 346/108; 340/763; 358/61, 232, 235; 455/611, 616

[56] References Cited

U.S. PATENT DOCUMENTS

| | | | |
|---|---|---|---|
| 2,354,591 | 7/1944 | Goldsmith | 350/96.18 |
| 3,621,138 | 11/1971 | McNaney | 346/108 |
| 3,710,015 | 1/1973 | Fowler | 358/232 |
| 3,841,733 | 10/1974 | Ebersole | 350/96.14 |
| 3,904,270 | 9/1975 | Cheo | 350/96.18 |
| 3,924,931 | 12/1975 | Cheo | 350/160 |
| 3,954,323 | 5/1976 | Andrews et al. | 350/96.14 |
| 4,221,460 | 9/1980 | Hepner et al. | 350/96.13 |
| 4,222,638 | 9/1980 | Robert | 350/96.14 |
| 4,330,813 | 5/1982 | Deutsch | 340/763 |
| 4,377,753 | 3/1983 | Mir | 250/578 |
| 4,523,803 | 6/1985 | Arao et al. | 350/96.14 |

OTHER PUBLICATIONS

Chen et al., "Light Modulation and Beam Deflection with Potassium Tantalate-Niobate Crystals", *Jr. App. Phys*, 1-1966, pp. 388–398.
Meyer, R. A., "Optical Beam Steering Using a Multichannel Lithium Tantalate Crystal," *App. Optics*, 3-1972, pp. 613–616.
Soref et al., "Active Fail-Safe Terminal for Fiber-Optic Data Bus", *App. Phys. Letts.*, 4-1978, pp. 408–410.

*Primary Examiner*—William H. Punter
*Attorney, Agent, or Firm*—Raymond L. Owens

[57] ABSTRACT

An electrooptic device for scanning and information modulating a plurality of light beams across an image zone is disclosed. The device includes a substrate formed of electrooptic material that changes its birefringence in response to an electric field established therein. A time-varying electric field is established in a portion of the substrate which varies the substrate refractive index so as to deflect an incident linear light beam. The device includes a lens arrangement which forms the deflected light beam into a plurality of beams focused at the image zone, and a light valve array which has a pixel portion for each focused light beam. Voltage signals applied to selected ones of a plurality of modulating electrodes of the light valve array cause selected ones of the array pixel portions to change their birefringence and change the polarization vector of their focused light beams as the beams are scanned across the image zone.

1 Claim, 4 Drawing Figures

ELECTROOPTIC DEVICE FOR SCANNING AND INFORMATION MODULATING A PLURALITY OF LIGHT BEAMS

BACKGROUND OF THE INVENTION

1. Field of the Invention

The present invention relates to devices which have electrooptic light valve arrays for scanning light beams.

2. Description of the Prior Art

Electro-optic materials are those whose optical properties change in accordance with the strength of an electric field established within them. These materials make possible an electrically controlled "light valve array" which in this disclosure includes an electrooptic member which receives a monochromatic plane-polarized (linear) light beam, and has a plurality of pixel portions each of which changes the state of polarization of incident light from the beam in response to an established electric field. An analyzer receives light from the pixel portions and blocks light that passes through a pixel portion when its plane of polarization has not been changed (no electric field) while transmitting light when its plane of polarization has been changed by an electric field. The term "monochromatic" as used herein means having a narrow range of frequencies.

One example of an electrooptic material used in light valve arrays is lanthanum-doped lead zirconate titanate (PLZT). Although PLZT is a preferred electrooptic material, it will be recognized by those skilled in the art that other electrooptic materials can also be used to change the polarization of light.

Without an electric field being established, some compositions of PLZT are optically isotropic, while others exhibit a static birefringence. In either case, when an electric field is applied through a body of PLZT, the PLZT crystal structure changes. This change in crystal structure causes a change in birefringence. An optic axis is thereby formed which is aligned parallel to the electric field lines. The optic axis is a direction, and not just one particular line.

A plane-polarized light wave incident upon the surface of a birefringent material from a direction perpendicular to the optic axis of the material can be resolved into two orthogonal component waves, one plane-polarized normal to the optic axis and the other plane-polarized parallel to the optic axis. These component waves travel through the material at different speeds and on leaving the birefringent material into an isotropic medium, the phase relation between the waves will be altered.

When a plane-polarized light wave enters and exits a birefringent member normal to the entering and exiting surfaces of the member and perpendicular to its optic axis, the two component waves exit the member at the same location and neither is refracted. Thus, they again form one wave. The phase difference between the exiting waves depends on the difference in the indices of refraction of the member in the orthogonal directions, and the thickness of the member. If these quantities are such that in traveling through the member, one wave is delayed behind the other by a one-quarter a wavelength, the member is a quarter-wave plate; if the delay is one-half a wavelength, the member is a half-wave plate. A half-wave plate changes the direction of polarization of a beam of polarized light by 90° provided the incident polarization direction makes an angle of 45° with the optic axis of the half-wave plate. With a quarter-wave plate, plane polarized light is converted to circularly polarized light when the plane polarized light makes an angle of 45° with the optic axis.

Light valve arrays have been constructed which include an isotropic member that has a pixel portion which can be converted into a half-wave plate by the establishment of an electric field. This member is sandwiched between crossed polarizers whose polarization orientations are typically at 45° angles to the optic axis of the half-wave plate. A light valve array has a plurality of such half-wave plates.

One preferred light valve array configuration is shown in U.S. Pat. No. 4,229,095 to Mir, includes a light valve array having a member formed of electrooptic material, such as isotropic lanthanum-doped lead zirconate titanate (PLZT), and a plurality of selectively addressable electrodes which define pixel portions of such member. The member is sandwiched between crossed polarizers. A pixel portion transmits received monochromatic light. When its electrodes are energized and establish an electric field, the pixel portion becomes a half-wave plate and changes the plane of polarization of incident light by 90°.

Light valve arrays must address many image pixels per line at an imaging zone in order to form images having even moderate detail. The number of pixels per line at an image zone increases in accordance with the resolution requirements of the imaging application. For example, it may become as large as 250 pixels per inch or larger for high-quality continuous-tone imaging. With prior devices, each image zone pixel is addressed by its own pixel portion. It is a difficult task to build light valve arrays with this many independently addressable pixel portions per line inch of image zone pixels.

Commonly assigned U.S. Pat. No. 4,377,753 to Mir discloses a light valve array arrangement with improved optical resolution. Each pixel portion of the light valve array addresses not one but a plurality of pixels in a particular region at the image zone. The arrangement includes an acoustooptic deflector which, in response to a variable frequency signal, deflects received plane-polarized light. The frequency of the signal controls the deflection angle while the amplitude of the signal controls the beam intensity. The device also includes a linear lens array and a member, formed of electrooptic material, which has electrodes that define an array of pixel portions. Each lens in the lens array corresponds to an array pixel portion. As light is deflected or scanned by the acoustooptic deflector through different parts of a particular lens it is directed through different parts of its corresponding pixel portion. The light is focused by the lens at the image zone. Electrical signals are selectively applied to the electrodes of the pixel portion, causing the pixel portion to change the plane of polarization of its transmitted light beam by 90°. An analyzer blocks those light beams whose planes of polarization have not been changed and transmits those whose planes of polarization have been changed.

Although this light valve array arrangement provides significant resolution improvement over previous arrangements, it is relatively bulky and difficult to align the optical elements. Another problem this array arrangement has is that it is a difficult process to electronically alter the acoustic drive frequency in an acoustooptic deflector to provide for highly accurate beam deflection which is needed in many scanning applications.

SUMMMARY OF THE INVENTION

The object of this invention is to provide a compact high-optical-resolution electrooptic device having a light valve array for focusing and scanning a plurality of light beams across an image zone without using an acoustooptic deflector, and for information modulating such beams by selectively changing their planes of polarization.

This object is achieved by an electrooptic device which includes a light valve array with a plurality of pixel portions each of which selectively changes the plane of polarization of incident light in response to an electrical signal and a substrate formed of electrooptic material and which receives a beam of plane polarized light. The device includes deflecting means for establishing through the substrate a time-varying electric field which varies the refractive index of the substrate so as to deflect the light beam and directs such deflected beam to be incident upon the array pixel portions. The device also has focusing means for causing the light which passes through each pixel portion to be formed into a light beam which is respectively focused at a predetermined region of an image zone as it is scanned or deflected.

The device is especially advantageous because it provides for improved optical resolution.

BRIEF DESCRIPTION OF THE DRAWINGS

Like reference numerals in the Figs. refer to like components.

DETAILED DESCRIPTION OF THE PREFERRED EMBODIMENTS

Figure 1:
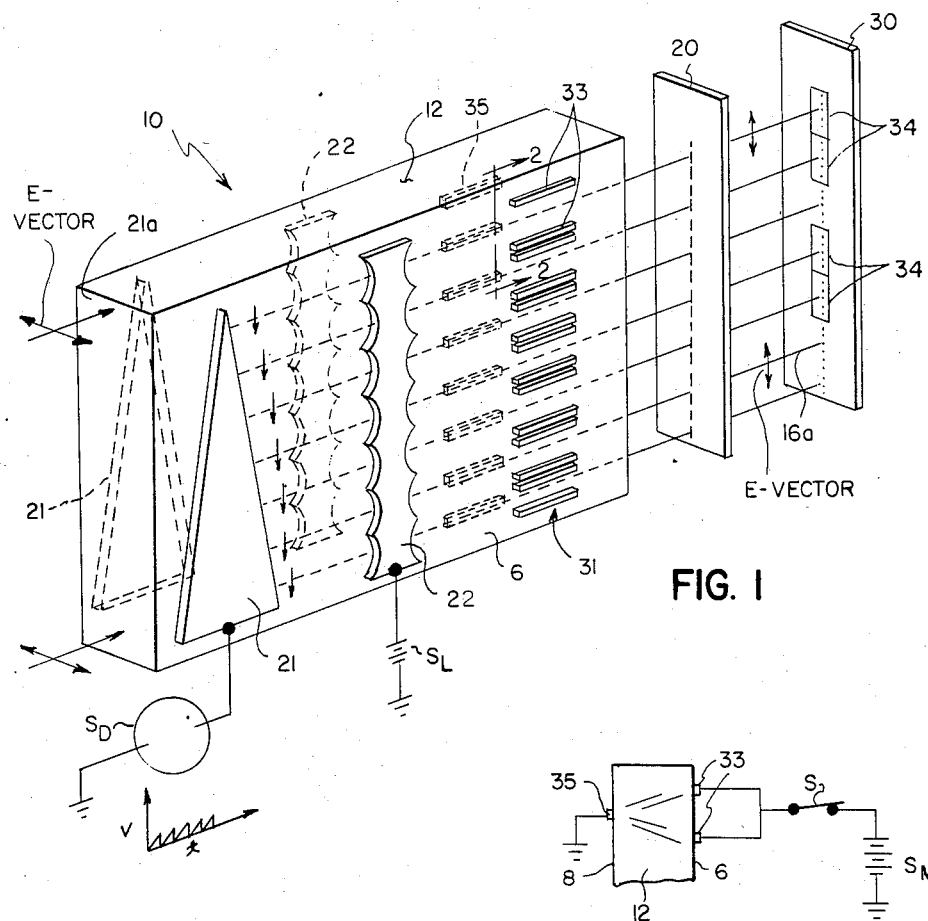
FIG. 1 is a schematic perspective illustrating an electrooptic device in accordance with the invention.

As shown in FIG. 1, there is provided an electrooptic device having a monolithic device 10 and an analyzer 20 in accordance with the invention. The dotted line across the analyzer 20 indicates the direction of the plane polarized light electric vector (E-vector) transmitted by the analyzer 20. The term monolithic device as used herein refers to a device formed on a single substrate 12. The substrate 12 is formed of an electrooptic material, preferably an optically isotropic PLZT which changes its birefringence in response to the establishment of an electric field in the substrate. A single input light beam of monochromatic plane-polarized light is incident normally upon the surface 21a of the device 10 from the left, as shown, and exits at the right as a plurality of beams focused at an image zone 30 spaced from the device 10. As shown the polarization or E-vector is perpendicular to the direction of travel of the light beam. The input light beam may be produced by any of several means (not shown) which are well known in the art, such as a laser, or an incandescent light source with a collimator, a filter and a conventional polarizer lens. A time varying electric field established between congruent electrodes 21 by a voltage source $S_D$ varies the substrate refractive index in the direction of polarization of the input light beam so that the beam is deflected as indicated by the downward pointing arrows adjacent electrodes 21. A plurality of beams are formed and focused by focusing means (a lens arrangement) which includes two congruent lenticular-shaped electrodes 22. By "lenticular-shaped" is meant the electrodes 22 have a shape generally similar to that of a cross-section of an array of cylindrical lenses. A DC potential from a source $S_L$ is applied between electrodes 22 to establish a constant electric field, the magnitude of which is dependent upon the location of the image zone 30. The lenticular-shaped electrodes 22 are of the double concave type. This is the preferred type with a PLZT substrate, wherein an established electric field effects negative refractive index changes. With a material in which the refractive index changes are positive, a positive lens configuration would be used instead.

In some applications, where the distance between the device 10 and the image zone 30 is fixed, electrodes 22 could be eliminated and non-electrical methods used for producing refractive index changes for forming and focusing light beams. In such applications, chemical modification such as doping of the substrate can be used to achieve the desired refractive index differences to focus the light beams at the image zone.

The device 10 includes a light valve array 31 with a plurality of pixel portions. Each of the light beams converge as they are deflected through a particular pixel portion of the light valve array 31. As each of the converging beams is scanned, its polarization is modulated by its pixel portion modulating means, which includes a pair of electrodes 33, and a single electrode 35. Each converging beam sequentially scans or addresses several pixels contained in a corresponding region 34 at the image zone 30. As will be shortly explained, each beam is information modulated to illuminate selected ones of the pixels in its corresponding region 34 while other pixels in the region are not illuminated.

Figure 2:
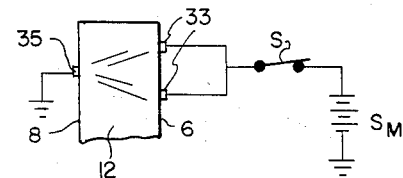
FIG. 2 is a partial sectional view taken along lines 2—2 of FIG. 1.

As shown in FIG. 2, the substrate 12 has first and second substantially parallel faces 6 and 8, respectively. All the electrodes are mounted on these surfaces. The lines between electrodes 33 and electrode 35 represent electric field lines for a pixel portion of the light valve array 31. They will be discussed more fully hereinafter. All the electrodes 21, 22, 33 and 35 can be built into the substrate or they can be deposited on the substrate by any of several means well-known in the art such as vacuum deposition of metal and photolithography. While the electrodes may be formed of any suitable material, metals such as chrome-gold, titanium-gold, and chrome-nickel-gold are particularly effective. Although not shown, it will be understood that the electrodes 21, 22 and 35 on the second parallel face 8 are held at the same fixed potential, for example ground.

The deflecting electrodes 21 respond to the time-varying voltage source $S_D$ to establish a time varying electric field in a portion of the substrate 12 between these electrodes. The characteristics of the signal $S_D$ will depend on the particular application of the device. As illustrated in FIG. 1, a ramp voltage signal is used. The electric field applied between the deflecting electrodes 21 is oriented generally perpendicularly to the two parallel faces 6 and 8 (see FIG. 2) and establishes an optic axis in the substrate 12 in the same direction as the established electric field. The input light beam incident normally upon the surface 21a passes between the electrodes 21 and is polarized parallel to the optic axis established between these electrodes. The refractive index changes at the interface between the isotropic bulk portion of substrate 12 and the portion of the substrate 12 between the electrodes 21 causes the light beam to deflect. Since the polarization of the input light beam is parallel to the optic axis established in the substrate between electrodes 21, the polarization of the light exiting into the isotropic substrate bulk does not change. The strength of the electric field controls the relative index of refractions between the isotropic and the birefringent portions of the substrate. The relative index of refraction parallel to the polarization vector of the input light beam controls the angle of deflection of the light beam. The angle of deflection determines the pixel locations at regions 34 at image zone 30 at which the electrodes 22 focus the converging beams. The rate of change of the angle of deflection is a function of the rate of change of the amplitude the applied ramp voltage signal.

The deflecting electrodes 21 are shown to be triangularly shaped, (see FIG. 1), but they can have any of a variety of other shapes provided that they cause an appropriate deflection of the input light beam.

The lenticular-shaped electrodes 22 in response to a constant voltage signal from a DC voltage source $S_L$ establish between them a constant electric field in the substrate 12. This applied electric field is oriented generally perpendicularly to the two parallel faces 6 and 8 and establishes an optic axis parallel to the electric field. The light beam passing in the substrate between electrodes 22 has its electric vector parallel to the optic axis established by the constant electric field. With this arrangement the polarization of the light beam remains unchanged. The combination of curvature of the electrodes 22 and the relative refractive index changes at the interface between the isotropic portions of the bulk substrate 12 and the portion of the substrate 12 between the electrodes 22, form the light from the beam incident into a plurality of converging beams. The voltage level of source $S_L$ controls the distance at which the converging beams are focused. The voltage level of this signal is selected to cause the converging beams as they are scanned to be focused at all pixel portions in their respective regions 34 at the image zone 30.

Referring now to FIG. 2, a single pixel portion of the light valve array 31 is defined by the electric fields applied between a pair of adjacent electrodes 33 on the first parallel face 6 of the substrate 12 and an electrode 35 on the second parallel face 8 of the substrate 12. The three electrodes 33 and 35 shown in FIG. 2 define one pixel portion. They apply two electric fields. The pair of electrodes 33 of the pixel portion are preferably adapted to receive identical DC voltage signals when a switch S is closed. Preferably, the electrodes of a pixel portion are arranged so that these electric fields and their established optic axes are oriented at 45° angles from the normal to the surfaces 6 and 8 of the substrate 12 and substantially perpendicular to the incidence direction of received light. The polarization of incident light upon a pixel portion is at an angle of 45° to these optic axes. The length of a pixel portion is selected so that when the proper strength electric field is applied through a pixel portion, the pixel portion becomes a half-wave plate and changes the plane of polarization of incident light by 90°.

Information is modulated by opening and closing switch S. When no voltages are applied to electrodes 33 (switch S being open), the analyzer 20 blocks the polarized light. However, when the switch S is closed, the fields as shown in FIG. 2 are established. The plane of polarization of a light beam in such a pixel portion is changed by 90° and such pixel light passed by the analyzer 20 and illuminates a pixel in a region 34 of the image zone 30.

Figure 3:
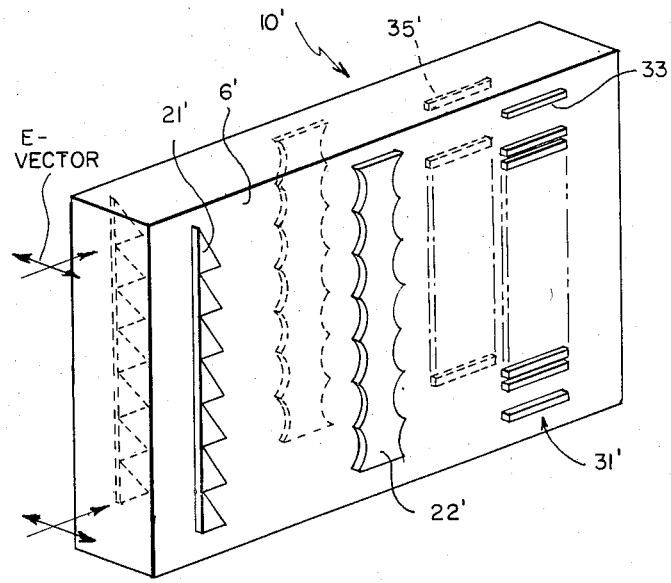
FIG. 3 is a schematic perspective illustrating another embodiment of a device in accordance with the invention.

In FIG. 3 is shown another embodiment of a monolithic device is shown. Corresponding parts carry the same numbers as in FIG. 1 except that they are primed ('). The monolithic device 10' of FIG. 3 has the same construction as the device 10 of FIG. 1 except that it includes "sawtooth" electrodes 21' that perform the same function as the deflecting electrodes 21 of the FIG. 1 device 10. An advantage, however, to the sawtooth shape is that it requires less space on a substrate and thus the device 10' can be made more compact. Another advantage is that it facilitates a shorter optical path length through the device 10'. Shorter optical path length minimizes scattering effects within the substrate. Of course, the sawtooth shape is merely illustrative of many electrode shapes which will suggest themselves to one skilled in the art. The device 10' functions in the same manner as device 10 of FIG. 1 and so its remaining elements and their operation need not be described further.

The devices shown in FIGS. 1–3 are a significant improvement in the art. They use a monolithic device which facilitates manufacture. However, they suffer from possible non-uniform electric fields in the light valve array pixel portions. Another problem is that they may produce unwanted scattering of light from abrupt refractive index gradients in the substrate 12 caused by the time varying electric field applied between electrodes 21.

Figure 4:
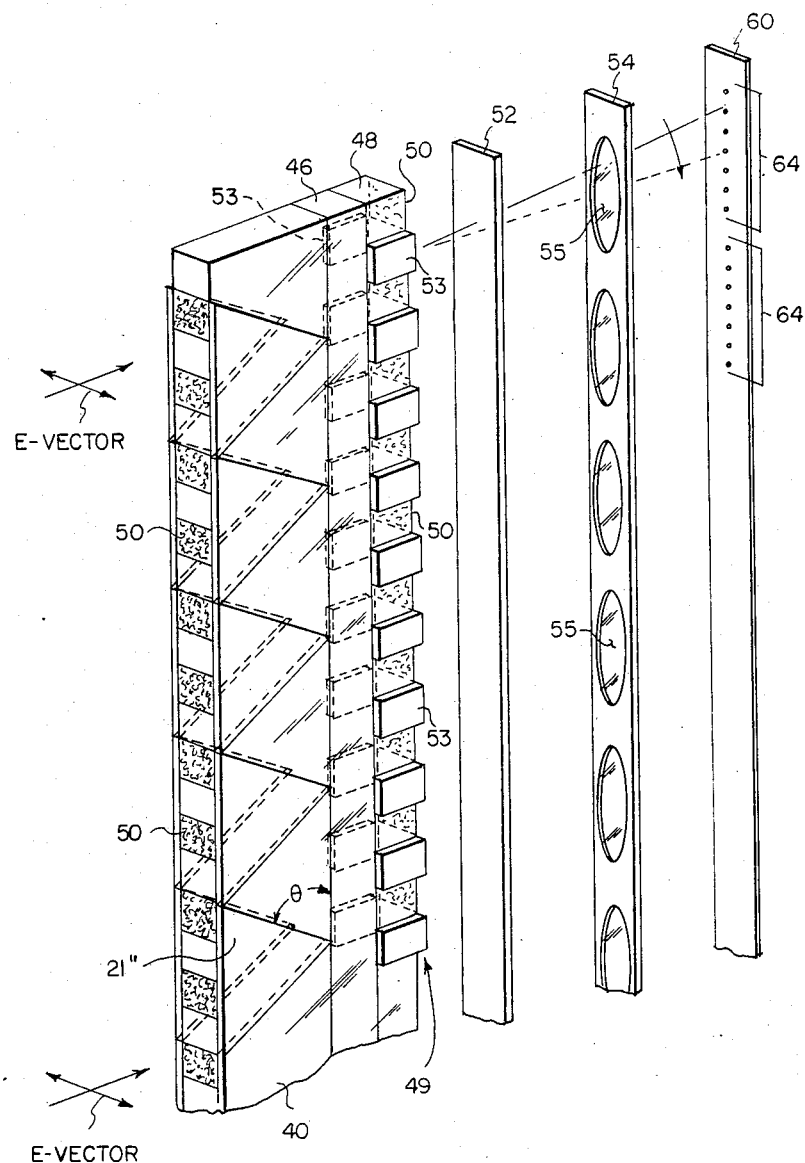
FIG. 4 is a schematic perspective illustration of yet another device embodying the invention.

In FIG. 4, an electrooptic device is shown which does not utilize a monolithic device, but is advantageous since it corrects the problems just noted. A member 40 is formed of electrooptic material (such as PLZT) which changes from an optically isotropic state to a birefringent state upon the establishment of an electric field therein. As shown, an input beam of plane polarized light is incident normally upon an entering surface of member 40. A half-wave plate 46 is bonded to member 40. A member 48 having an electrooptic substrate which has an integral light valve array 49 is bonded to member 6. Each pixel portion is defined between two electrodes 53. Affixed to the member 40 are triangularly shaped electrodes 21'' which apply a time varying electric field parallel to the input polarization of the incident light beam. This field causes the light beam to deflect. The two electrodes are adapted to be responsive to a time-varying voltage signal from a voltage source (not shown) to establish the time-varying electric field through a portion of member 40 in the same manner as described above for the electrodes 21 of previous embodiments.

The optical path length is minimized and light scattering problems are reduced by providing the triangularly shaped electrodes 21'' in the form of a plurality of congruent isosceles triangles on opposite sides of member 40. A plurality of opaque masks 50 are provided on the entering surface of member 40 and on the exiting surface of the member 48. The opaque masks 50 on member 40 are positioned to respectively block light passing through the electric field produced between the vertices of the isosceles triangular electrodes 21'', where the refractive index gradient change is most abrupt. The opaque masks 50 on member 48 block light in the areas between pixel portions where there could be crosstalk. In addition, increasing the angle θ, (See FIG. 4) improves the deflection efficiency. Using 9065 PLZT, with θ=60°, one degree of deflection can be achieved with a field change of about 20 KV/cm. The major tradeoff with increasing θ is that the optical path through the deflector section also increases. In some electrooptic materials (e.g. PLZT) a long optical path can result in considerable light scattering.

As we have already seen in the other embodiments, it is desirable that the electric field be parallel to the direction of the polarization vector in purely refractive applications (deflecting and focusing) and at a 45° angle to the direction of polarization in the light valve pixel portions to provide the on-off 90° polarization change at an analyzer.

The half-wave plate member 46 between the deflecting member and member 48 has its established optic axis at a 22.5° angle to the direction of the polarization vector of the normally incident input light beam on the member 48. This changes the plane of polarization of the polarized light beam by 45°. This polarization change permits the use of only two electrodes 53 for each array pixel portion which can apply highly uniform electric fields in response to a constant voltage applied between electrodes 53 by conventional means (not shown) rather than the three electrodes used in the other embodiments. The light valve pixel portion electrodes 53 are placed directly opposite each other on the member 48 which results in a uniform (non-fringing) modulating electric field. Light passing through a pixel portion between the electrodes 53 will not be blocked by the opaque masks 50 on the members 40 and 48. As noted above, light is blocked by the masks 50 on member 48 between pixel portions. Also, the ratio of the separation of adjacent electrodes 53 to the thickness of member 48 is selected to be large enough to avoid crosstalk resulting from pixel portion-to-pixel portion electric field interactions. A linear analyzer 52 is provided with its transmission axis set perpendicular to the polarization vector of the linear light entering member 48. A member 54 includes an array of identical lenses 55 is also provided. Each lens element focuses a particular modulated beam at a region 64 of an image zone 60. The lens focal lengths are determined by the deflection angle and lens-to-lens separation to insure that pixels of adjacent regions 64 of the image zone 60 will butt together in a continuous fashion. The lens array could be for example a "Selfoc" array or a lenticular array similar to that formed by the electrodes 22 shown in FIG. 1.

The invention has been described in detail with particular reference to certain preferred embodiments thereof, but it will be understood that variations and modifications can be effected within the spirit and scope of the invention.

I claim:

1. A monolithic device for receiving a beam or plane polarized light, forming such received beam into a plurality of converging beams, focusing such beams at an image zone spaced from the device, information modulating such converging beams by changing the planes of polarization of selected ones of such plurality of converging beams, and scanning such plurality of converging light beams across the image zone, said device comprising:

(a) a substrate formed of electrooptic material which changes from one state to a birefringent state in response to an electric field established therein; and
   (b) a plurality of electrodes on said substrate including
      (i) at least one electrode responsive to a time-varying voltage signal for establishing through a first portion of said substrate a time-varying electric field which causes said first portion to vary its refractive index and deflect the received light beam without changing its polarization;
      (ii) a lenticular-shaped electrode responsive to a received fixed voltage signal for establishing through a second portion of said substrate an electric field which causes said second portion to change its refractive index, such that said second portion is adapted to receive the deflected light beam, form a plurality of beams, and focus each of the beams at a particular region of an image zone; and
      (iii) a light valve array having a plurality of modulating electrodes defining pixel portions, each said pixel portion being adapted to receive one of said plurality of beams, said modulating electrodes being responsive to voltage signals to establish through selected ones of said pixel portions electric fields which cause each of said selected pixel portions to change the plane of polarization of its light beam, whereby a beam of plane polarized light received by said device is formed into a plurality of beams which are focused at and scanned across respective regions of an image zone while their planes of polarization are selectively changed.

* * * * *